(12) United States Patent
Majumdar et al.

(10) Patent No.: US 6,386,255 B1
(45) Date of Patent: May 14, 2002

(54) TIRE REPAIR PATCH INCLUDING BIS-IMIDE COMPOUND

(75) Inventors: Ramendra Nath Majumdar, Hudson, OH (US); Ezra Dewayne Bonds, Riner, VA (US); Douglas Watha Miller, Lindside, WV (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/365,086

(22) Filed: Jul. 30, 1999

(51) Int. Cl.[7] .............................................. B29C 73/10
(52) U.S. Cl. ......................... 152/367; 152/370; 156/97
(58) Field of Search ............................. 156/96, 97, 98; 152/367, 370

(56) References Cited

U.S. PATENT DOCUMENTS

| | | | |
|---|---|---|---|
| 4,285,382 A | 8/1981 | DiRocco et al. | |
| 4,385,651 A | 5/1983 | Arquilla | |
| 4,399,854 A | 8/1983 | DiRocco et al. | |
| 4,540,035 A | 9/1985 | Roberts | |
| 4,798,640 A | 1/1989 | Koch et al. | |
| 5,264,472 A | 11/1993 | Wideman et al. | |
| 5,328,636 A | 7/1994 | Maly et al. | |
| 5,503,940 A | 4/1996 | Majumdar et al. | |
| 5,951,797 A * | 9/1999 | Majumdar et al. | 156/96 |
| 6,186,202 B1 * | 2/2001 | Majumdar et al. | 156/96 |

* cited by examiner

Primary Examiner—Steven D. Maki
(74) Attorney, Agent, or Firm—Henry C. Young, Jr.

(57) ABSTRACT

Tire patches are described for off-the-road (OTR) tires. At least the base cushion gum layer and the top cushion gum layer include a bis-imide in an effective amount to reduce reversion of the gum rubber composition during repair and during use. The bis-imides are significantly more effective in this application than other reversion inhibitors.

14 Claims, No Drawings

TIRE REPAIR PATCH INCLUDING BIS-IMIDE COMPOUND

FIELD OF INVENTION

Tire patches for off-the-road (OTR) tires use multiple plies of fabric, generally embedded in gum rubber cushion layer. These patches are installed in the inner cavity of the tire. A plug of rubber is used to patch the injury from the outside of the tire. The patch is either cured in place or partially cured before installation and then adhered to the inner cavity with gum rubber or an adhesive. Due to the slower rotation speeds and higher tire costs of OTR tires, these patches are designed to repair even substantial holes in a tire. These tires are used on a variety of commercial, construction, and excavation equipment.

BACKGROUND OF THE INVENTION

Only very small holes are patched in tires used on vehicles operated at high speed due to the multiplicity of problems caused by tire failure or deflation when traveling at high rates of speed. Due to the decreased hazards associated with failure at lower speeds of operation and increased costs associated with replacing specialized off-the-road (OTR) tires, they are routinely patched when the holes therein are substantial. Off-the-road tires with larger holes can be patched or repaired by applying fabric reinforced patch on the inside of the tire and a plug on the exterior portion of the tire.

Various configurations of multiple fabric reinforcements, in combination with layers of gum rubber, have been used to patch tires. U.S. Pat. No. 4,399,854 provides details on one such patch with a partially-vulcanized ply or plies. These patches are intended to bridge over the injury to the tire transferring stresses to the non-injured portion of the tire.

Problems encountered with this technique include 1) overcuring and/or undercuring the patch components due to problems associated with uniformly heating and crosslinking thick patches and 2) crack initiation at the interface between the tire and the patch. Patches without fabric reinforcement are generally too low in modulus to be effective repairs.

SUMMARY OF THE INVENTION

Tire patches are disclosed that utilize bis-imide compounds as part of the gum rubber composition of the patch. This compound 1) helps prevent reversion of the rubber during the curing (crosslinking) process for the tire patch and 2) minimizes heat buildup and reversion of the gum rubber components of the tire patch during tire use (revolution), which may cause failure of the rubber components at the high stress locations near the interface of the tire and the patch.

The patches generally comprise at least two overlapping plies of reinforcing cords coated or embedded in a gum rubber composition which form a ply package, an unvulcanized base cushion gum layer at the underside of said patch for engagement with a surface of a tire, an unvulcanized top cushion gum layer at the opposite side of the patch from said underside, said base and top cushion gum layers enclosing and surrounding said ply package and usually being joined at a location beyond the edges of said ply package. The gum rubber composition of the top and/or base cushion gum layer desirably includes from about 0.1 to about 5 phr of a bis-imide compound to stabilized the gum rubber against reversion and heat buildup. The gum rubber composition of the plies may also include the bis-imide compound. Preferred bis-imide compounds include Perkalink® 900 and HVA-2® from Flexsys in Akron, Ohio and DuPont in Wilmington, Del., respectively. In a tire patch gum rubber composition, these bis-imides will decrease the tendency to undergo reversion and will increase the time to blowout in the Goodrich blow-out test.

DETAILED DESCRIPTION OF THE INVENTION

The repair of off-the-road (OTR) tires typically uses a patch comprising at least a first and optionally a second gum rubber composition, a ply package which includes at least two overlapping plies of reinforcing cords coated with rubber or partially or fully embedded in said first or second gum rubber composition, an unvulcanized base cushion gum layer at the underside of said patch for engagement with a surface of said tire, an unvulcanized top cushion gum layer (protective layer) at the opposite side of the patch from said underside, said base and top cushion gum layers surrounding and enclosing said ply package and usually being joined at a location beyond the edges of said ply package. In the current embodiment at least the top cushion gum rubber composition, optionally said base gum rubber composition, and optionally said second gum rubber composition comprises an effective amount of a bis-imide compound to reduce reversion and/or heat buildup in the Goodrich blow-out test. Said bis-imide compound desirably having the structure:

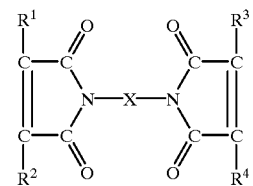

where $R^1$, $R^2$, $R^3$, and $R^4$ are independently hydrogen, an alkyl group of 1 to 5 carbon atoms, an alkylphenyl group having 7 to 10 carbon atoms or a halogen substituted alkyl group having from 1 to 5 carbon atoms, a halogen substituted phenyl group, or a halogen substituted alkylphenylene group having a total of from 7 to 10 carbon atoms, and where X is an alkylene group having from 1 to 5 carbon atoms, a phenylene group, an alkylphenylene or alkylenephenyl group having 7 to 10 carbon atoms, an oligomer of alkylene and phenylene groups having from 11 to 30 carbon atoms, or a halogen substituted alkylene group having from 1 to 5 carbon atoms, a halogen substituted phenylene group, or a halogen substituted alkylphenylene or alkylenephenyl group having a total of from 7 to 10 carbons atoms.

Preferred bis-imides are Perkalink®900 from Flexsys having the chemical structure N,N'-m-xylylene bis-citronic imide and HVA-2® from DuPont having the chemical structure N,N'-m-phenylene bismaleimide. These compounds are desirably used in an effective amount to reduce reversion and/or heat buildup in the Goodrich blowout test. Effective amounts are generally from about 0.1, 0.2 or 0.3 to about 5 or 10 phr (parts by weight per 100 parts by weight of rubber in the composition), and are more desirably from about 0.3 or 0.5 to about 2 or 3 phr.

The gum rubber compositions of the base and top cushion layers and optionally of the ply layers generally comprises a hydrocarbon sulfur curable rubber, fillers, and curatives. For example, a curative agent such as phenol formaldehyde can be added to the gum rubber compositions in amounts from about 1 to about 10 parts by weight per 100 parts by weight of rubber in the composition. It may optionally include oils, antioxidants, antiozonants, stearic acid, etc. in conventional amounts. It generally will not include fibrous reinforcements such as fibers or cords unless converted to a ply layer. The gum rubber composition may include tackifiers in an effective amount to promote adhesion of the gum rubber composition to itself, fibers or cords, and to the cured tire carcass. U.S. Pat. No. 5,503,940 is hereby incorporated by reference for its general teachings on bis-imides and its specific teachings on tackifiers. Desirably the tackifier is present in an amount from about 2 to about 25 phr. Carbon black is desirably present from about 20 to about 70 phr and more desirably from about 30 to about 55 phr. Desirably the carbon black has a mean ultimate particle diameter of less than 285 and preferably less than 60 nm per ASTM D-3849. The gum rubber compositions can be mixed in any rubber mixing equipment such as a Banbury, multiple roll mill, etc. It is desirable to perform the mixing so the heat sensitive curatives are added in a late mixing step at a rubber temperature below the activation temperature for the curative. Generally the gum rubber compositions are formed into sheets (e.g. by calendering) having a thickness from about 0.01 5 to about 0.500 inches.

The rubber in the gum rubber compositions can be any conventional hydrocarbon rubber used in tire manufacturing such as those derived from polymerizing conjugated dienes of 4 to 10 carbon atoms, optionally, copolymerized with vinyl substituted aromatic monomers having from 8 to 12 carbon atoms. Such rubbers include natural rubber, styrene-butadiene rubber (SBR), polybutadiene, polyisoprene. EPDM rubber or the various butyl rubbers may also be used in combination with other rubbers.

The gum rubber compositions used in the top and base cushion layers desirably have the bis-imide therein to prevent reversion and heat buildup in the Goodrich blowout test. The base cushion layer conforms to the shapes of both the plies and to the inner surface of the tire thereby bonding the two together. The base cushion layer is subjected to a lot of stress as the tire flexes during rotation under the large loads typical of OTR tires. These stresses can cause energy to be dissipated as heat into the cushion layer during rotation. As the coefficient of heat transfer of rubber is low, this heat can build up in the cushion layer and lead to reversion if the cushion compound is not compounded to be resistant to reversion. Reversion is the breaking of chemical bonds in the crosslinked rubber resulting in a crosslinked rubber component with less load bearing polymer chains and softer composition. If reversion is taken to the extreme case, it results in a liquid rubber without any load bearing chains to retain the shape of the original crosslinked rubber.

The plies comprise a reinforcing fiber or belt and a rubber composition such as a gum rubber composition. The reinforcing fiber may be coated with a rubber composition or may be calendered with a gum rubber composition, similar to those of the cushion layers, to partially or fully embed the fibers in the rubber. The plies can include any high modulus material such as fibers, cords, woven or nonwovens, wires, belts, etc. The fibers can be nylon, polyester, polyamides, etc. Ply thickness is not critical, but is often from about 0.018 to about 0.025 inches (0.05 to about 0.06 cm). Cords are desirably longitudinal cords which are held in side by side relationship by pick cords or other suitable means such as adhesive. Often ply layers are placed at 90° angles when building ply packages. Two or more overlapping plies are used to form a ply package. Often six or more plies are used in a ply package to provide stiffness and strength. Two or more ply packages can be used in a single patch. Multiply ply packages in a single patch are often separated by a gum rubber composition. Plies can be partially-cured in any rubber curing equipment after being coated or partially or fully embedded in a rubber composition (layer). The intent of the plies is to provide a unified structure with sufficient strength to bridge the injury in a tire. When a number of plies are in a ply package, they may be stitched or adhered by rolling. It is desirable to eliminate any air from the patch that may result from the layering of plies and gum rubber cushion layers. The patch may also be stitched or adhered by rolling to the tire during patch installation.

Patch sizes can vary depending on the size of the injury to the tire and the type of tire being patched. Generally patch sizes include a base of an area from about 1 to about 1200 square inches (6.5 cm$^2$ to about 7,700 cm$^2$), more desirably from about 5 to about 900 square inches (32 cm$^2$ to about 5,800 cm$^2$), and preferably from about 25 to about 800 square inches (161 cm$^2$ to about 5,200 cm$^2$). The patches are usually installed on the interior or inner tube region of the tire. A plug of rubber can be inserted from the exterior of the injury to fill any voids from that side. The patch is then cured by applying heat such as in a mold or autoclave.

It is desirable to firmly hold the patch in place during elevated temperature curing to effect a good bond to the carcass of the tire. If too much pressure is applied, the gum rubber layers may excessively deform during patch curing. The patch is generally cured by heat entering from the top of the patch and from heat applied through the tire that in combination effect a cure of the base layer of the patch. A tire curing or tire retreading mold can be used to cure the patch. A press with heated platens can press the patch against the injury on the tire. The patch can be secured in place under pressure and the entire assembly (tire, patch, and clamping devices) can be placed in an autoclave. Thicker patches inherently take longer to cure as it takes longer for the heat to flow through the rubber on the exterior of the patch to the interior plies of the patch to cure the interior plies. As one would expect there is a need to expose portions of the tire carcass and patch to more heat than is necessary for curing so that the interior of the patch receives enough heat for a long enough period of time to fully cure. This problem of overheating parts of the patch is the reason the gum rubber compositions need good reversion resistance. Treating time (heated) during this operation is added to the heat history of the tire and reduces the amount of additional heating the tire carcass can withstand in subsequent repairs or retreading.

In the past, cure times have been up to 8 to 10 hours. Sometimes the tire is subsequently immediately retreaded which may involve another 10 to 18 hour elevated temperature cure for the tire.

The general steps in forming a patch for a OTR tire include a) forming at least a first and optionally a second gum rubber composition, b) coating at least a first and second ply of reinforcing cords with said first or second gum rubber composition (may include calendering one or more plies of reinforcing cord into a gum rubber layer), c) laying a least a first ply on top of a second ply to form a ply package, and d) positioning the ply package between an unvulcanized top cushion gum layer and an unvulcanized base cushion layer. Thereafter, one can optionally join the cushion gum layers beyond the edges of the ply package. The patch may also be stitched to itself or to the tire carcass as part of the repair process. The plies may be partially cured before being enclosed in between the top and base gum rubber cushion layers. Additional intervening gum rubber layers may be used in between the ply layers.

The injury to the tire is conventionally inspected to remove any foreign material before the patch is applied. The injury may be reshaped or ground with an abrading device to facilitate an effective repair. Generally the patch is applied from the inside or inner tube region of the tire. The base of the patch is generally larger in area than the top of the patch. It is desirable to use a patch formed in the shape of a pyramidal frustum. The shape is characterized as being the residual part of a pyramid next to the base after cutting off the top if the pyramid by a plane parallel to the base. A pyramidal frustum-shaped patch is actually made by forming only the bottom portion of the pyramid. A pyramid will be used in this application to describe a polyhedron with a polygon for a base and triangular faces that would have a common vertex. It is understood that since pyramidal frustums are used, the side won't have the common vertex as each triangle is converted to a polygon with parallel base and top. U.S. Pat. No. 4,399,854, already incorporated by reference shows many ways to make pyramidal frustums.

The top and base gum rubber cushion layers protect the plies and help to transmit forces from the tire to the plies. As the gum rubber cushion layers have lower modulus than the highly reinforced ply layers, they are more compliant and tend to distribute the load more evenly to the plies minimizing fracture of the patch or the bond between the patch and the tire carcass. The cushion layers may contain additives such as tackifiers that enhance initial building tack to the carcass. Often at least the base cushion layer is thicker than the plies to offer more rubber to accommodate uneven distribution of stress which may be applied to the cushion layer by the carcass or by the plies of the patch.

The patch after being applied to the tire over the injury needs to be cured.

EXPERIMENTAL

Samples of a gum rubber composition suitable for use in a patch were prepared according to the following Table 1. Then the material of Table 1 was modified by adding various amounts of antioxidants and heat stabilizers as set forth in Table 2. In Table 2, the Thermal Stability was measured by slowly curing the gum rubber compositions in a cure rheometer for 7 hours at 127° C. (260° F.). The thermal stability was considered good if no decrease in torque was observed during the 7 hour test period. If at any stage the torque decreased with time during the 7 hour period, the thermal stability was considered poor. The percent reversion was calculated by the following equation:

% Reversion=100 (Max. Torque−Torque at 7 hours)/Max. Torque

The thermo-mechanical stability was measured in a Goodrich blow-out test ASTM 623 where a plug of crosslinked rubber is cyclically compressed at a specified rate and the temperature of the rubber and time to failure (blowout) are recorded. If the blow-out time is greater than 24 minutes, the thermo-mechanical stability of the sample is considered good. If the time is less than 13 minutes it is considered poor.

TABLE 1

| Material | grams |
| --- | --- |
| Natural rubber | 100 |
| Zinc oxide | 0.5 |
| Stearic acid | 5.15 |

TABLE 1-continued

| Material | grams |
| --- | --- |
| Phenol formaldehyde polymer | 5.71 |
| BLE-75 from Uniroyal (antioxidant)[1] | 1.37 |
| Pine tar | 6.60 |
| N-220 carbon black | 45.0 |
| Santoguard PVI[2] | 0.5 |
| Accelerator | 0.86 |
| Polymeric sulfur | 3.86 |

[1]BLE-75 is the reaction product of diphenylamine and acetone.
[2]Santoguard PVI is N-(cyclohexylthio)phthalimide.

TABLE 2

| | | Thermal Stability | | Thermo-mechanical Stability | |
| --- | --- | --- | --- | --- | --- |
| Cmpnd | Additive | % Rvrsn | Cmts | Blowout | Cmts |
| Std. | none | 4.4 | Poor | 12 min | Poor |
| Std + | 2 phr Perkalink | 0* | Good | 25 min | Good |
| Std + | 4 phr Duralink | 3.2 | Poor | 8 min | Poor |
| Std + | 2 phr Perkalink + 4 phr Duralink HTS | 0* | Good | 9 min | Poor |
| Std + | 2 phr Irganox 1010 | 0* | Good | 11 min | Poor |

*Sample showed increasing modulus rather than decreasing.

The data in Table 2 illustrates that the control composition (even though it contained an antioxidant (BLE-75) had both poor thermal stability and thermo-mechanical stability in comparison to the same recipe with the addition of 2 phr of Perkalink® 900 (a bis-imide of the formula claimed). The same formulation with Duralink HTS, post vulcanization stabilizer, had neither good thermal nor good thermo-mechanical stability. Duralink is hexamethylene bisthiosulfate disodium salt dihydrate from Flexsys. It is used as a post vulcanization stabilizer for sulfur-cured rubbers. A sample with a blend of Perkalink and Duralink had good thermal stability but poorer thermo-mechanical stability than a sample with Perkalink alone. Finally, a sample with Irganox 1010 (an antioxidant) had good thermal stability but poor thermo-mechanical stability in comparison to the standard with Perkalink.

The data in Table 2 illustrates that the bis-imides improve the standard gum rubber composition giving it significantly improved thermal stability and thermo-mechanical stability. The thermal stability prevents reversion of the gum rubber during curing of the patch components. The thermo-mechanical stability reduces the risk of failure due to heat buildup during use.

The gum rubber compositions of this disclosure are useful in the base and top gum rubber cushion layers in an OTR (off-the-road) tire patch and/or in the ply layers of the same patch. The patches are useful to repair OTR tires in a more cost effective way leading to stronger patches with longer lifetimes. As the bis-imides function to maximize the modulus of the gum rubber compositions they offer an opportunity to reduce the amount of gum rubber in a patch without compromising the strength of the patch. A patch with less mass would cure in a shorter time, decreasing the amount of heat and time required to cure the patch. The decrease in curing time would be beneficial to the tire carcass as tire carcasses suffer reversion upon extended heating.

While in accordance with the patent statutes the best mode and preferred embodiment has been set forth, the scope of the invention is not limited thereto, but rather by the scope of the attached claims.

What is claimed is:

1. A tire repair patch for application to a surface of an off-the-road tire at an injured portion having a through hole, said patch comprising a first gum rubber composition and optionally a second gum rubber composition, an uncured ply package of at least two overlapping plies of reinforcing cords either coated with rubber or partially or fully embedded in said first or second gum rubber composition said ply package remaining uncured until said patch is cured after assembly into said tire injured portion, an unvulcanized base cushion gum layer at the underside of said patch for engagement with said surface of said tire, an unvulcanized top cushion gum layer at the opposite side of the patch from said underside, wherein at least said base and top cushion gum layers comprise said first gum rubber composition, said first gum rubber composition including from about 0.1 to about 5 phr of a bis-imide compound of the formula

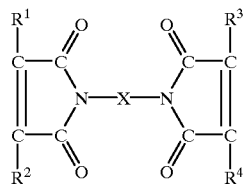

where $R^1$, $R^2$, $R^3$, and $R^4$ are independently hydrogen, an alkyl group of 1 to 5 carbon atoms, an alkylphenyl group having 7 to 10 carbon atoms or a halogen substituted alkyl group having from 1 to 5 carbon atoms, a halogen substituted phenyl group, or a halogen substituted alkylphenylene group having a total of from 7 to 10 carbon atoms, and where X is an alkylene group having from 1 to 5 carbon atoms, a phenylene group, an alkylphenylene or alkylenephenyl group having 7 to 10 carbon atoms, an oligomer of alkylene and phenylene groups having from 7 to 30 carbon atoms, or a halogen substituted alkylene group having from 1 to 5 carbon atoms, a halogen substituted phenylene group, or a halogen substituted alkylphenylene or alkylenephenyl group having a total of from 7 to 10 carbon atoms.

2. The patch of claim 1, wherein the ply package is in a general shape of a pyramidal frustum.

3. The patch of claim 1, wherein the rubber around said reinforcing cords also comprises from about 0.1 to about 5 phr of said bis-imide compound.

4. The patch of claim 1 wherein the rubber comprises polyisoprene rubber, polybutadiene rubber or a styrene-butadiene rubber or combinations thereof.

5. The patch of claim 1 wherein the rubber of said base cushion gum layer and said top cushion gum layer comprises a reinforcing carbon black in the amount from about 30 to about 55 phr.

6. The patch of claim 1 further comprising from about 2 to about 25 phr of carbon black in said first gum rubber composition.

7. The patch of claim 1, further comprising from about 1 to about 10 parts of phenol formaldehyde resin in said first rubber gum composition.

8. The patch of claim 1 bonded to an off-the-road tire.

9. A method for making a tire repair patch for application to a surface of an off-the-road tire at an injured portion having a through hole comprising the steps of:

a) compounding a first gum rubber stock including from about 0.1 to about 5 phr of a bis-imide compound of the formula

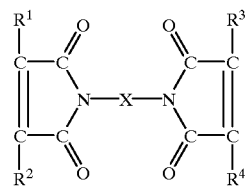

where $R^1$, $R^2$, $R^3$, and $R^4$ are independently hydrogen, an alkyl group of 1 to 5 carbon atoms, an alkylphenyl group having 7 to 10 carbon atoms or a halogen substituted alkyl group having from 1 to 5 carbon atoms, a halogen substituted phenyl group, or a halogen substituted alkylphenylene group having a total of from 7 to 10 carbon atoms, and where X is an alkylene group having from 1 to 5 carbon atoms, a phenylene group, an alkylphenylene or alkylenephenyl group having 7 to 10 carbon atoms or a halogen substituted alkylene group having from 1 to 5 carbon atoms, a halogen substituted phenylene group, an oligomer of alkylene and phenylene groups having from 11 to 30 carbon atoms, or a halogen substituted alkylphenylene or alkylenephenyl group having a total of from 7 to 10 carbon atoms, and optionally a second gum rubber stock, b) calendering said first or second gum rubber stock with at least two plies of reinforcing cords, c) laying said plies one on top of the other to form a ply package, d) forming an unvulcanized top and a bottom cushion gum layer from said first gum rubber stock, e) positioning said ply package between the unvulcanized top cushion gum layer and the unvulcanized base cushion gum layer, and f) maintaining the ply package in an uncured state until said patch is cured after assembly into said tire injured portion.

10. The method of claim 9 wherein said top and bottom cushion gum rubber layers are joined at a location beyond the edges of said ply package.

11. The method of claim 9 further including applying said repair patch to the inner portion of an off-the-road tire.

12. The method of claim 9, wherein the rubber around said reinforcing cords also comprises from about 0.1 to about 5 phr of said bis-imide compound.

13. The method of claim 9, wherein the ply package is in a general shape of a pyramidal frustum.

14. The method of claim 9 wherein said rubber calendered with said at least two plies of reinforcing cords is also said first gum rubber stock.

* * * * *